March 26, 1929.  G. N. LINGHAM ET AL  1,706,622
ACCOUNTING APPARATUS
Filed May 1, 1919   4 Sheets-Sheet 1

INVENTOR.
George N. Lingham
BY Harry W. Williams
ATTORNEY

March 26, 1929.　　G. N. LINGHAM ET AL　　1,706,622

ACCOUNTING APPARATUS

Filed May 1, 1919　　4 Sheets-Sheet 2

Patented Mar. 26, 1929.

1,706,622

UNITED STATES PATENT OFFICE.

GEORGE N. LINGHAM AND HARRY W. WILLIAMS, OF DAYTON, OHIO, ASSIGNORS, BY DIRECT AND MESNE ASSIGNMENTS, OF ONE-THIRD TO FRANK L. WALKER AND TWO-THIRDS TO OLIVE THOMAS LINGHAM, BOTH OF DAYTON, OHIO.

ACCOUNTING APPARATUS.

Application filed May 1, 1919. Serial No. 293,996.

This invention relates to accounting machines, and particularly to means for registering, indicating, or printing by means of one set of number elements a given sum or amount, and automatically computing, registering, indicating or printing as the case may be, by means of a separate set of number elements a predetermined proportionate part of the said given sum, or for registering, indicating or printing a predetermined proportion of a given sum by means of one set of number elements, and the remaining portion of such sum by means of an auxiliary set of number elements, which are controlled by common setting or operating elements.

The necessity or desirability of such a mechanism arises primarily from the imposition of governmental taxes upon certain articles of commerce, whereby the merchant is required to apportion to the Government a certain percentage of the sales of certain commodities, which is usually computed by adding the tax to the normal price of the commodity, but which may be met by setting aside or separating a proportionate part of the established sale price. The use of the mechanism is not limited, however, to computation and separation of tax amounts, but is capable of use in determining commissions, discounts, profit percentages, and numerous other purposes which readily occur to the expert accountant.

The object of the invention is to provide such a mechanism which will be simple in structure, as well as in its means and mode of operation, whereby it will not only be cheap in construction, but will be efficient in operation, accurate in action, easily operated, automatic, and unlikely to get out of repair.

A further object of the invention is to provide such a mechanism which will be under the direct control of the operator whereby it may be set to operate in the instance of the sale of one commodity to register, indicate, or print the amount of the tax or other segregated sum, while in other instances only the normal sum, or one predetermined portion thereof will be registered, indicated, or printed, without such characterization of the segregated amount.

A further object of the invention is to provide such mechanism which may be easily, quickly and readily applied to existing cash registers and accounting machines.

A further object of the invention is to provide means whereby the computation and characterization of the normal and added amounts or the segregated portions of the total sum will be effected automatically by the manipulation of a single set of one or more amount determining elements which are common to both sets of number elements.

With the above primary and other incidental objects in view as will more fully appear in the specification, the invention consists of the features of construction, the parts and combinations, thereof, and the mode of operation, or their equivalents, as hereinafter described and set forth in the claims.

Referring to the drawings.

Like parts are indicated by similar characters of reference throughout the several views.

In the following description and accompanying drawings the present invention is shown embodied in a cash register of the type shown and described in expired patent to Thomas Carney, No. 497,860 issued May 23rd, 1893, and associated with a totalizing counter disclosed and described in expired patent to F. Barnard No. 570,196 issued October 27th, 1896, and further exemplified in sundry other patents subsequent thereto. The present features of invention are applicable to those register mechanisms wherein the operative keys are arranged in multiples of five, as illustrated in patents to Cleal, 773,059, and 773,060, both of October 25, 1904, Werner, 773,108, October 25, 1904, Tod 789,189, May 9, 1905, Cleal 786,346, April 4, 1905, Hutchinson et al 860,478, July 16, 1907, and numerous others of analogous constructions. Such features of invention, however, are equally applicable to register mechanisms employing a key board in which the keys are arranged in multiples of ten preceded by keys representing the integers one to nine, as illustrated in the aforementioned patent to Carney 497,060, May 23, 1893, Cleal, 872,900, December 3, 1907, Carney 876,295, January 7, 1908, Carroll 879,081, February 11, 1908, and others of analogous construction. The advantages of those registers of the first group is that only one key or manipulative element need be operated to register a sum ending in five or a multiple of five, whereas in the econd group of patents, the five cent key is necessarily separately operated in unison with the key representing multiples of ten, in order to register a sum terminating in a five. These prior art constructions are used only for illustrative purposes as a setting for the present invention. The present invention is not limited to the particular association mentioned, but is applicable, in various forms to other types and styles of accounting and computing machines, including other forms and constructions of cash register mechanism. It is also to be understood that while in the drawings the invention has been disclosed, for illustrative purpose, embodied in a registering mechanism of the total adder or accumulating type, these same number members if exposed through the casing or cabinet may serve as indicators or if provided with characters in relief may be used as printing elements, or since indicators and printing wheels are quite common in the art of accounting and computing machines and cash registers, such indicators and printing elements may be connected and associated with the number elements shown, and operated in unison therewith by any of the well known coupling means of the prior art to simultaneously indicate, print and register the segregated amounts.

The cash register mechanism employed for illustrative purpose is provided with a plurality of amount determining elements, 1, in this instance depressible keys of the lever type. These amount determining elements are grouped according to denomination, as cents, dimes and dollars, according to the maximum capacity of the machine. In the mechanism shown the keys are arranged to determine normal sums of multiples of five cents. The keys 1 of the present construction are pivoted upon a transverse shaft 2 and when depressed raise a key coupler element which in turn actuates a double rack (neither of which elements are shown in the drawing, but are shown and described in the prior patents referred to) thereby giving a complete rotation to the main shaft 3. Attached to the rear end of each key lever is an elevator bar 4 which operatively engages with a transverse rod 5 carried by a rearwardly extending arm 6 of an oscillatory gear sector 7 pivoted on the transverse shaft 8. There is one gear sector 7 provided for each bank of keys, i. e. each series of keys of like denomination. The engaging shoulders of the elevator bars are arranged in echelon whereby each bar moves idly a different distance before engaging and actuating the sector and thus operating the sectors through different degrees of movement agreeing with the values of the operated keys. The several sectors 7 serve to actuate the cents, dimes and dollars elements of a totalizing counter or register which is automatically shifted into and out of operative engagement with the sectors at each operation of the machine.

Figure 1:
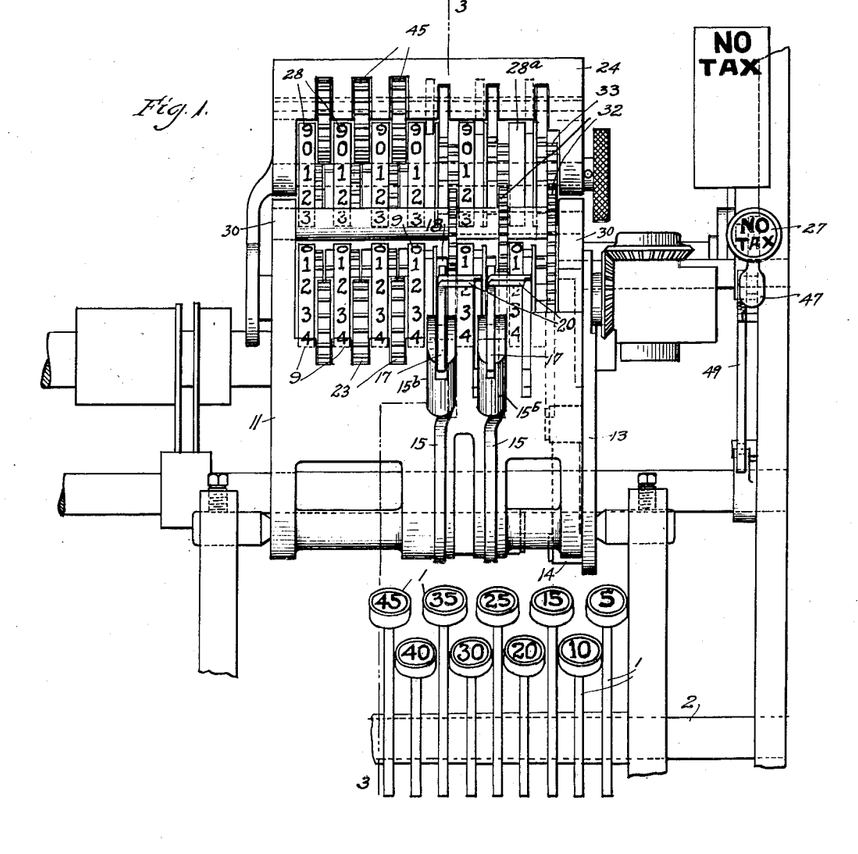
Fig. 1 is a front elevation of a fragmentary portion of an accounting machine embodying the present invention.
Figure 2:
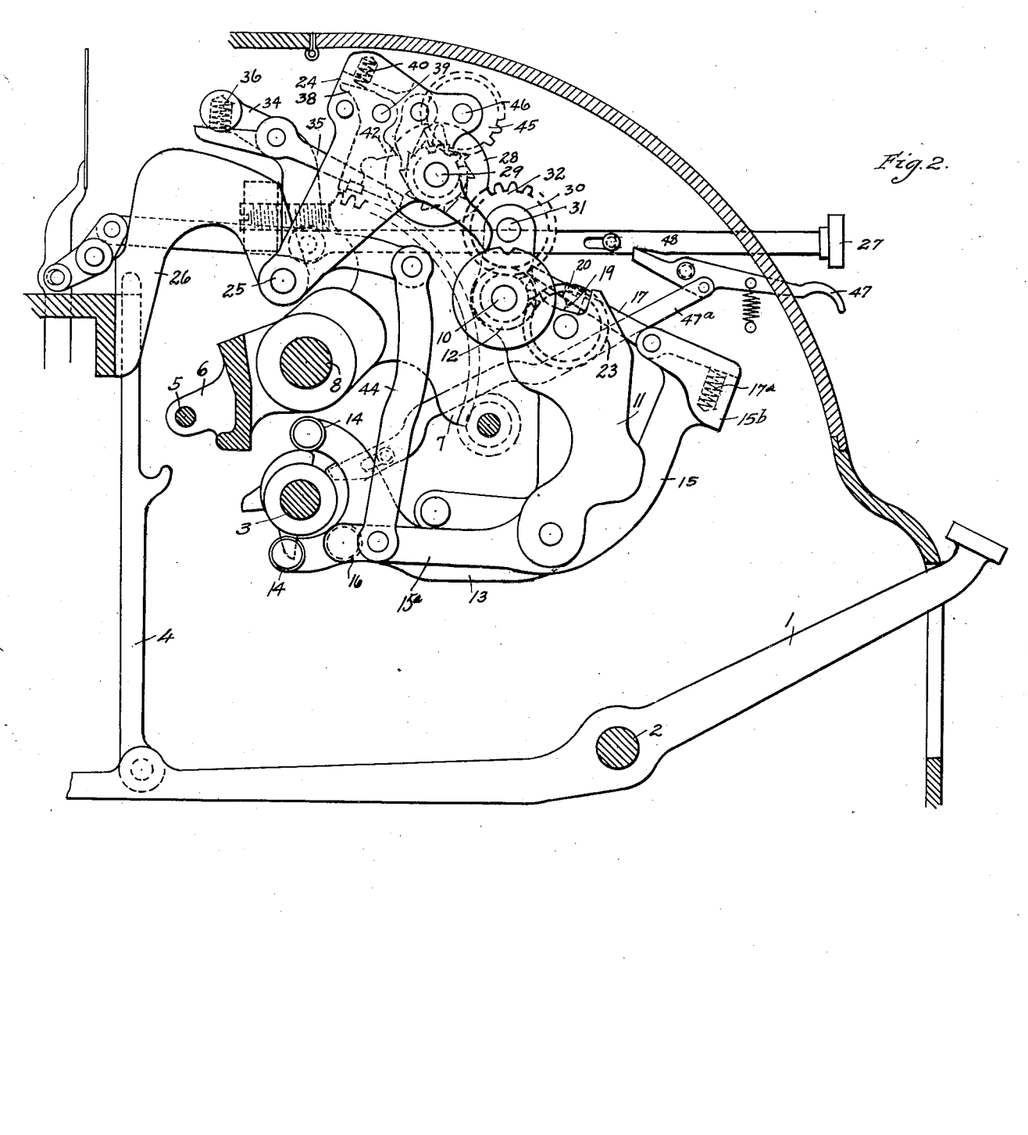
Fig. 2 is a side elevation from the left of Fig. 1, many portions of the accounting mechanism being omitted and parts thereof shown in section.
Figure 3:
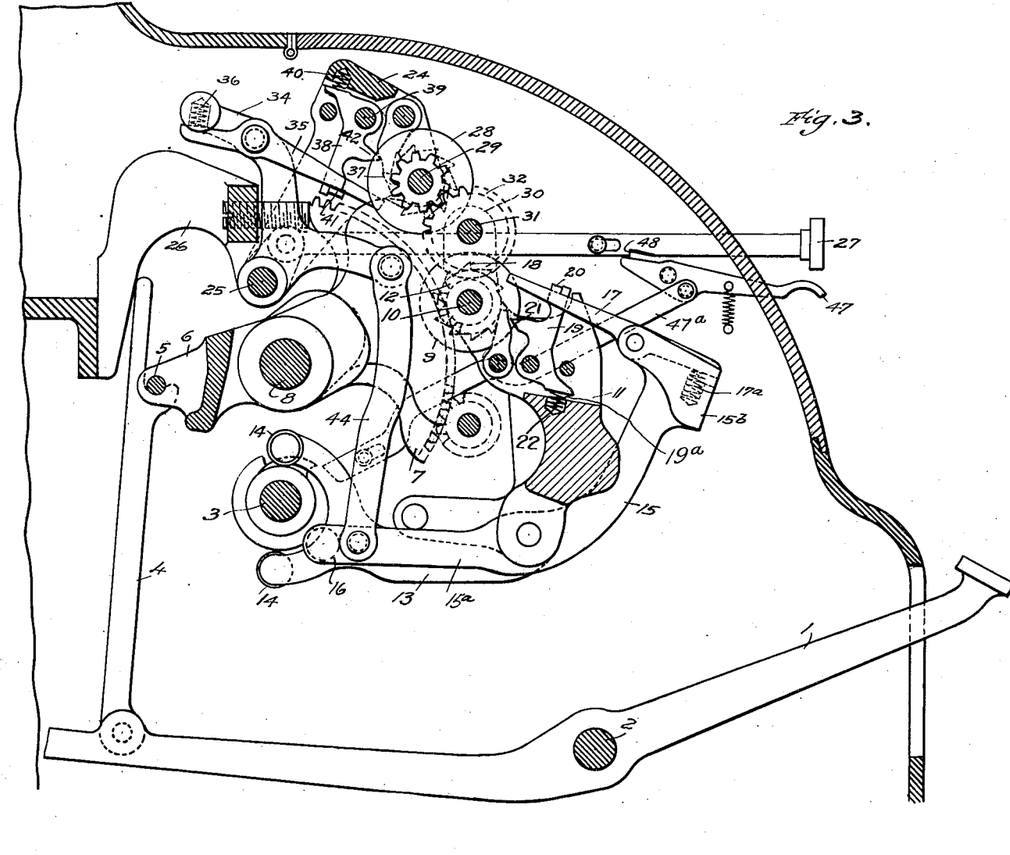
Fig. 3 is a sectional view substantially on line 3—3 of Fig. 1.
Figure 4:
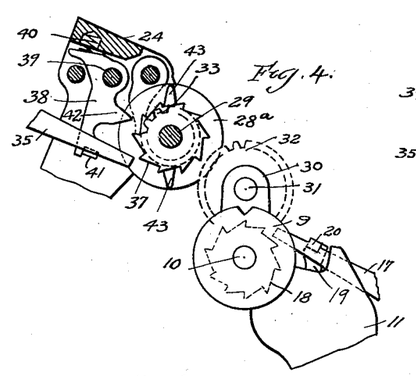
Fig. 4 is a detail side view of the computing and transfer means pertaining to the cents denomination.
Figure 5:
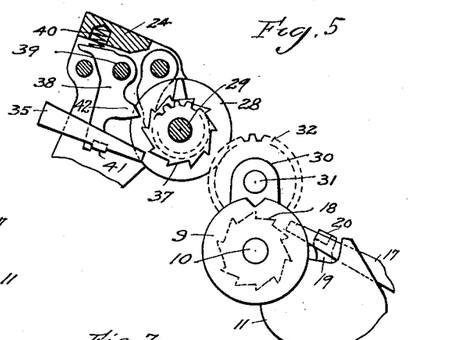
Fig. 5 is a similar view of the like mechanism pertaining to the dimes denomination.

The main or normal sales counter comprises a series of revoluble counter wheels 9 carried upon a shaft 10 mounted in an oscillatory carrier frame 11. The units, tens and hundreds or cents, dimes and dollars counter wheels are provided with interconnected gear pinions 12, which upon oscillation of the carrier frame are caused to mesh with the corresponding actuating gear sectors 7, pertaining to the cents, dimes and dollars banks of keys or those representing units, tens and hundreds. The carrier frame 11 is provided with a rearwardly extending throw arm 13 carrying antifriction rollers 14 which are engaged by a cam upon the main shaft 3 at each operation of the machine. By this means the gear pinions 12 of the counter wheels are held in mesh with the sectors 7 during their movement in one direction and are thereby rotated a distance corresponding with the movement of the sector, which in turn agrees with the numerical value of the operated key. Transfer means is provided by which the movement of any counter wheel through a series of ten steps will effect the automatic movement of the next succeeding counter wheel one step, thus "carrying one" from units to tens, tens to hundreds etc. In cash registers of the type shown it is cutomary to provide the units, tens and hundreds counter wheels with transfer devices of the lever and pawl type, while the counters of higher denomination are actuated for transfer purposes by intermittently operated gear connections. These transfer mechanisms are fully described in the prior patents before mentioned to which reference is to be had for detailed descriptions. It will be sufficient here to say that as shown in Figs. 1, 2 and 3 of the drawings the lower denomination transfer mechanism devices comprise the oscillatory levers 15, pivoted concentric with the carrier frame 11, one arm 15$^a$, of which extends rearwardly and carried an antifriction roller 16, engaged by a cam on the main shaft 3, while the other arm of said lever extends forwardly and upwardly and is provided with a head 15$^b$ in which is pivoted a spring actuated pawl 17, the forward end of which is pressed upward by a spring 17$^a$ in said head, thereby tending to depress the rearward end of the pawl into engagement with the ratchet wheel 18 interconnected with the corresponding counter wheel 9. The pawl 17 is held elevated and normally inoperative by a pivoted detent 19 carried by the swinging carrier. This detent engages a laterally extending finger 20 carried by the pawl 17 with which it is held in engagement by a spring 22. It is to be understood that the pawl and detent are offset in relation one with the other, the detent being associated with the counter wheel of lower denomination and the pawl is associated with the wheel of next higher denomination, the intervening space being bridged by the lateral finger 20.

The detent 19 is provided with a forward projecting finger 21 extending into the path of a cam or projection on its associated counter wheel which upon the completion of the addition of ten units to such wheel engages the finger 21 and oscillates the detent against the tension of the spring 22 causing it to disengage the finger 20, whereupon the pawl 17 is actuated by its spring 17$^a$ into position to engage the ratchet wheel 18 of the counter wheel of next higher denomination, which is actuated to turn such counter wheel one step at the succeeding oscillation of the transfer lever 15 under the influence of its operating cam on the shaft 3. The counter wheels of higher denomination are interconnected through a series of intermittently operated gears indicated at 23, Fig. 2, and mounted on a second transverse shaft in the swinging carrier 11.

The mechanism as thus far described is that of a well known type of cash register, here employed for the purpose of illustrating and explaining the operation of the improvements hereafter described. In the mechanism described and as now in use the amount of each successive transaction represented by the manipulated keys is added upon the totalizing counter before described. In the improved construction the normal, basic, or principal sum continues to be added upon the said totalizing counter. However in addition thereto a second counter is provided, with mechanism designed to automatically operate said second counter in unison with the principal or basic counter to add upon the second counter a predetermined proportion of the basic or principal sum registered on the main counter, or a sum bearing a certain predetermined relation thereto. Means being also provided for rendering the second counter inoperative at the will of the operator.

To this end there is provided a second or auxiliary oscillatory counter frame 24, pivoted at 25 to the frame bracket 26. This frame is oscillated to and fro into and out of operative position under control of a reciprocatory key 27, which for convenience will be designated as the "No tax" key, it being understood that other designations may be applied in the event that the second counter is used for other purposes as to indicate commissions, profits, or merely percentage computations.

The auxiliary swinging frame 24 carries a series of counter wheels 28, similar to the counter wheels 9, mounted on a transverse shaft 29 located in said frame. There is this difference however, the counter wheel 28$^a$ to the right is not considered in reading the results of the computations, but is a minimum tax, or percentage counter which adds the minimum percentage on reduced amounts. For instance the machine as shown is designed to register on the second counter ten percent of the basic amount added on the main counter. The minimum amount to be computed and added is of course one unit or one cent, on a ten percent basis whether the amount of the basic sum or sale price be ten cents, five cents, or any other sum less than ten cents. For instance the Government tax proposed on soda fountain sales is one cent on a five cent drink and one cent on a ten cent drink. A fifteen cent sale carries with it a two cent tax as does also a twenty cent sale. This right hand counter wheel 28$^a$ thus accounts for those instances where the actual tax assessed exceeds the normal tax rate. The second wheel from the right of the second series of wheels 28 becomes the unit or cents counter and is opposite the dimes counter of the main register, while the initial wheel 28$^a$ is blank. The third wheel from the right is the tens counter of the auxiliary register and is shown opposite the hundreds wheel of the main or basic counter. This relation is maintained throughout, the number of elements of the auxiliary counter being offset or transposed one place to the left in relation with the main or basic counter.

Mounted on an intermediate shaft 31 between the counter wheels of the respective counters or registers, and carried in bearing lugs 30 in the primary swinging frame 11, are a plurality of idler gears 32 regularly in mesh with the gear pinions 12 of the units, tens and hundreds, or cents, dimes and dollars counter wheels of the basic or main register. Upon forward swinging movement of the auxiliary or second counter frame 24, the gear pinions 33 interconnected with the counter wheels of the second or auxiliary register are brought into mesh with said idler gears. By the offset or transposed relation of the readable counter wheels of the respective registers the units or cents counter of the basic register is interconnected through the intermediate idler gear 32 with the pinion 33 of the initial or minimum wheel of the auxiliary counter which has no readable value indicated thereon but which serves to transfer to the next succeeding counter wheel the minimum tax on reduced or partial amounts. The second or tens counter wheel of the basic counter is interconnected through the corresponding idler gear with the gear pinion 33 of the units or cents wheel of the auxiliary register. Likewise the hundreds or dollars wheel of the basic counter is interconnected through the corresponding intermediate gear 32 with the tens or dimes wheel of the auxiliary counter. It will be clear that on each operation of a counter wheel of the basic register, the interconnected wheel of the auxiliary register will be actuated to like extent. However inasmuch as the counter wheels of the auxiliary counter have been transposed or offset, decimally one place to the left, and the tens or dimes wheel of the basic or main register interconnected with the units or cents wheel of the auxiliary register, and the hundreds wheel of the basic register interconnected with the tens wheel of the auxiliary register, the movement of the interconnected wheels through like degrees of rotation will indicate upon the auxiliary register ten percent of the amount counted upon the basic register. That is to say the rotation of the tens wheel of the basic register to add seventy cents will move the units wheel of the auxiliary register like distance to add seven cents or ten percent of the basic amount. Likewise the movement of the hundreds wheel of the basic register to add two dollars will actuate the tens wheel of the auxiliary register through the interconnecting idler gear 32 to add thereon twenty cents or ten percent. Transfer mechanism hereafter described is provided for transferring, or "carrying one" from the units or cents wheel of the auxiliary register to the tens wheel thereof, and from the tens wheel to the hundreds wheel, and to succeeding wheels in like manner. This construction thus far described will compute and register the required percentage of the basic amounts where the basic amounts are multiples of the tax amount. That is to say it adds the ten percent to the auxiliary register in those instances where the basic amount is ten or a multiple of ten.

However in those instances involving a five in the basic amount, as five, fifteen, twenty-five, thirty-five, etc., for which the percentage to be added is that of the next higher multiple of ten, the initial blank wheel 28$^a$ comes into play. This blank wheel 28$^a$ is interconnected with and rotates in unison with the units or cents wheel of the basic register. This connection is through the initial intermediate idler gear 32 of the series. In the register mechanism interconnections (not shown) are provided whereby the operation of any key involving five in its value will effect the oscillation of the units or cents sector 7 and the initial or units wheel of the basic register to like degree to register thereof five units or cents in addition to the dimes or dollars added by the corresponding sectors. Inasmuch as one cent or unit is to be assessed or added to each five cent amount alone or each five cents or units in excess of ten or a multiple of ten, means is provided for transferring from the initial or blank wheel 28$^a$ one unit or one cent to the units wheel of the auxiliary register each time the blank wheel 28$^a$ makes a half revolution, the understanding being that a complete revolution of any wheel is equivalent to ten units, ten tens or ten hundreds as the case may be.

The transfer mechanism for the auxiliary register is quite similar to that for the basic register except that it is operated from the rear and under the counter wheels, in lieu of from the front and over the wheels as in the case of the basic or main register, Mounted upon a Y shaped lever or bell crank 34 pivoted concentric with the swinging auxiliary frame 24 is a transfer pawl 35 corresponding to the basic register pawl 17. The rearward end of the pawl is spring pressed downward by a spring 36 which tends to raise the forward end of the pawl into engagement with the ratchet wheel 37 corresponding to the previously described ratchet wheel 18. The ratchet wheel 37 is interconnected with the units or cents wheel of the auxiliary counter, and a similar ratchet wheel is connected with the tens wheel thereof. A transfer lever 34 and pawl 35 is likewise provided for each of these wheels.

A detent 38 pivoted to the auxiliary frame 24 at 39 is spring actuated by the spring 40 into engagement with the lateral finger 41 of the pawl 35 to hold the pawl out of engagement with the corresponding ratchet wheel 37. This detent 38 has a finger 42 projecting into the path of a cam or projection on the related counter wheel, by which the detent is oscillated out of engagement with the pawl. The initial or blank wheel 28$^a$ is provided with two such cams or projections 43 (shown in the detail view) located at diametrically opposite points, or at intervals of five steps or spaces on from the other. The result is that every time the cents or units wheel of the basic register is operated to add five cents to said register, whether it be a single five cents or units, or the terminal five of some greater sum, one or the other of the cam projections 43 of the blank wheel 28$^a$ moves past the finger 42, pushing said finger out of its path and releasing the engaged pawl which rises to position to engage the ratchet wheel 37 and add one cent or unit upon the units wheel of the auxiliary register upon the subsequent oscillation of the transfer lever 34. The transfer arm is connected to the corresponding primary transfer lever 15 by a link 44, whereby the oscillation of the primary lever 15 to effect the transfer upon the basic register, also oscillates the auxiliary transfer lever 34 to effect the transfer upon the auxiliary register.

The transfer upon the auxiliary register from the blank or initial wheel to the cents or units wheel is effected simultaneously with the transfer from the units or cents to the dimes or tens wheel of the main or basic register, and the transfer from the units or cents wheel of the auxiliary register occurs simultaneously with the transfer from tens to hundreds upon the main or basic register.

The higher denominations or counter wheels of the auxiliary register are provided with the system of gearing before referred to in connection with the main or basic register and described in the prior patents before mentioned. This transfer mechanism includes a plurality of gears 45 mounted on a shaft 46 carried by the auxiliary frame 24 and meshing with the gear pinions 33 of the higher denominations of counter wheels whereby each succeeding wheel is advanced one step at the completion of ten steps by the preceding wheel. It will be obvious that the intermediate gears 32 between the main or basic counter and the auxiliary counter may be carried by the auxiliary swinging frame 24, by mounting the shaft 30 in the auxiliary frame in lieu of the primary swinging frame 11.

In such case the idler gears would be permanently meshed with the auxiliary counter wheel pinions, and intermittingly engaged with the gear pinions of the main register counter wheels.

Inasmuch as tax is not to be assessed in all instances, means is provided for disconnecting the auxiliary register at the will of the operator and for automatically returning it to operative position upon completion of the "No tax" transaction. As before mentioned the reciprocatory key 27 controls the swinging frame 24. By pressing this key 27 inward the auxiliary counter frame is rocked upward and rearward about its pivotal connections 25, and out of engagement with the intermediate gears 32. A spring actuated detent 47 is adapted to engage a shoulder 48 in the stem of the key 27 when the latter is depressed to hold the auxiliary register out of operation until the completion of the cycle of movements of the mechanism. A reciprocatory bar 47$^a$ connected at one end to the detent 47 and engaged at its opposite end by a cam on the main shaft 3 as the operation of the machine is completed serves to release the detent 47, permitting the swinging frame 24 carrying the auxiliary register to return to normal engaged position. The detent 47 is extended through the case or cabinet and provided with a finger lift by which the operator may release the detent and auxiliary register in the event a mistake has been made by pressing the "No tax" key. While the machine shown in the drawings is a cash register of the key lever type, the percentage or partial amount counters may be applied to push key constructions, adding or computing machines, tallying devices or operation counters, and other like constructions. Furthermore while the improvement has been described more particularly as a tax computing and registering, indicating, or recording device, the term tax as herein employed is to be interpreted as including any percentage or proportional segregation, whether for tax purposes, discounts, commissions, profits, or other apportionment or share. By merely rearranging the key designations or the numerical value of the amount determining devices the apparatus as described may be utilized for the separation into proportionate amounts the sum represented by the manipulated keys. For example whereas the operation of the fifty cent key effects the registration of fifty cents upon the basic or main register and five cents upon the auxiliary register, which involves adding to the amount represented by the manipulated keys, the amount of the tax or surcharge, by the change of the key designation from fifty cents to fifty five cents the whole amount represented by the manipulated keys would be subdivided and one portion of the amount represented by the manipulated keys would be registered on the basic or main register and the remainder upon the auxiliary register, the amounts actually registered being the same, i. e. fifty cents and five cents. So far as the mechanism and actual operation of the device is concerned it is immaterial whether the amount determining elements manipulated shall represent a basic sum less the percentage, or the whole sum including the percentage.

Because the assessment of a minimum tax, as one cent on a ten cent sale or any sale less than ten cents, involves some difficulties not met with in a straight percentage computing mechanism, such variations of mechanism have been herein described in detail. In a straight percentage computing mechanism where the auxiliary register is to systematically add throughout the exact percentage of the basic sum registered upon the main register, the right hand wheel 28$^a$ of the auxiliary register would not be left blank, but would be numbered as are the other wheels and in such event would represent mills. The connection and arrangement of the counter wheels would be exactly as before described, assuming that the required percentage is ten percent. The reading of the counter wheels in such event would be as follows:—

Percentage ____________________ 374. 892
Basic sum ____________________ 3748. 92

In a construction as before described in which the prescribed minimum tax is added for all sums less than the minimum principal sum as adding one cent for ten cent sales and all sales less than ten cents, the auxiliary or percentage counter gains on the small sales and will indicate more than the exact ten percent of the sum on the main counter. In such construction the counter wheels of the respective counters may indicate as follows, the blank wheel 28ª being represented by "X":—

Tax __________________________ 396. 43X
Sales ________________________ 3748. 92

While for convenience the percentage herein assumed has been ten percent, and further in view of the fact that the present government commodity tax on certain articles is ten percent, it is not to be understood that the mechanism is limited to the segregation of this proportion only, but by varying the proportions of the gear pinions 12, 32 and 33, the auxiliary counters may be made to travel at different ratios in relation with those of the main counter and other percentages or proportions may be effected.

Figures 6, 7, 8, 9, 10:
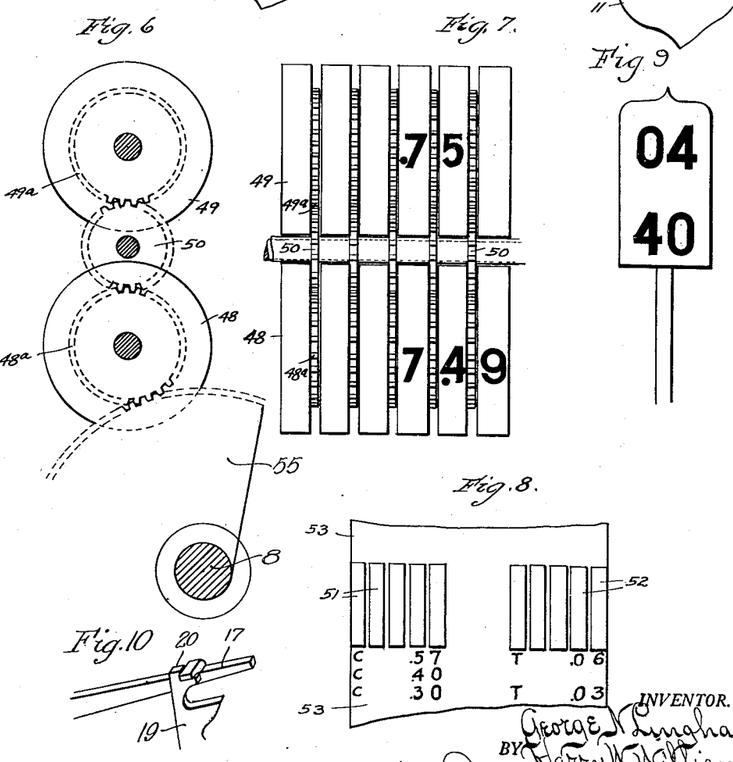
Figs. 6 and 7 are detail views of the differential indicator means for simultaneously indicating the principal sum and percentage.
Fig. 8 illustrates printing means therefor.
Fig. 9 is a detail view of a tablet form of indicator.
Fig. 10 is a detail perspective view illustrating the supporting engagement of the detent with the transfer pawl.

In Figs. 6 and 7 there is shown means for indicating the proportionate amounts, comprising two series of indicator wheels 48 and 49, each having an interconnected gear pinion 48ª and 49ª respectively, which pinions are interconnected by intermediate idler gears 50 in such manner that the two series of indicator wheels operate in unison.

One series of indicator wheels represents dollars, dimes, cents and mills, or whole numbers, tenths, hundredths and thousandths, while the other series of indicators represents dollars, dimes and cents, or whole numbers, tenths and hundredths. The indicators of the one series are connected by the intermediate gears with the indicators of the next lower denomination of the other series so that in this case one indicator represents a given amount and the connected indicator exhibiting the same figure but of lower denomination represents ten per cent of the amount shown by the first mentioned indicator. These indicators 48 and 49 may be operated by any suitable means, preferably, however, by a gear section 55, as shown in Fig. 6, and corresponding to the gear sector 7, for operating the counter mechanism. As a matter of fact the gear sector 7 may be utilized for actuating the indicator wheels or drums 48 and 49 in unison with the adjustment of the counters.

The same principle is applied to printing or recording the apportioned or segregated amounts. In Fig. 8 are shown two series of type elements 51 and 52 adapted to print upon the usual detail strip or tape 53 the segregated amounts. The type wheels or elements 51 and 52 may be operated in the same manner and in unison with the adjustment of the indicator drums 48 and 49, and the counter mechanism. In fact Fig. 6 of the drawings may be considered as illustrative of the printing devices, wherein the wheels or drums 48 and 49 may be considered as being the equivalent of the type wheels 51 and 52. These type wheels are then adjusted in unison with the adjustment of the indicator wheels, and the counters by the gear segment 53, corresponding to the gear sector 7, or by the sector 7 in unison with the registers. In the ten per cent adaptation as before described, the units printer of the tax or percentage series 52 is connected to operate in unison with the tens printer of the main sum series 51, and the dimes printer of the tax series is connected to operate in unison with the dollar printer of the main sum series, as has been previously described in connection with the registration and indication of the amounts. In such event the tax or percentage series is rendered inoperative upon the depression of the "No tax" key, so that in those instances where no tax or percentage is to be computed only the amount of the sale or the principal sum is recorded, while if a tax amount is added on the auxiliary counter the same amount is printed on the detail strip opposite the amount of the sale or principal sum as shown in said figure. The interconnection of registering, indicating and recording means for simultaneous operation is not unusual, and the particular operative connections to be employed are not material, the important thing being the simultaneous indicating, registering and recording or any one of these operations, of proportional amounts or segregated portions of a given amount, by means of separate sets of accounting members controlled by a single set of amount determining elements common to both sets of accounting members, when involving the combinations set forth in the appended claims.

The construction herein shown and described is further capable of use as a totalizing counter or what is termed in cash register phraseology as "tied up" counter. For instance the two counters may be arranged to operate in unison to register identically the same sums. That is to say, whenever the primary register is operated to add a sum determined by the value keys, the secondary register may be operated from the first register to add the same sum. If the primary register is provided with resetting devices such as are common for returning this register to zero at the end of the day's business, and the secondary register is not accessible to the clerk for such resetting, then the secondary register will operate as an accumulator to indicate total sums. In other instances, it might be utilized to keep certain sales separate. As for instance, where soda water and cigars are to be kept separate from other sales. Assuming that the two registers operate in unison to add the same sums and the no tax key is operated for each general merchandise sale, but is not operated for soda water or cigar sales then at the end of the day the secondary register would show the soda water and cigar sales.

From the above description it will be apparent that there is thus provided a mechanism of the character described, possessing the particular features of advantage before enumerated as desirable, but which obviously is susceptible of modification in its form, proportions, detail construction, and arrangement of parts, without departing from the principle involved or sacrificing any of its advantages.

Having thus described our invention, we claim:—

1. The combination with a cash register mechanism including an operating mechanism, a series of amount determining elements controlling the mechanism and an accumulator in which amounts represented by manipulated amount determining elements are accumulated, of a second accumulator actuated by the same control mechanism to add thereon one cent for each ten cents accumulated upon the first accumulator and an additional one cent for any additional portion of said sum less than ten cents accumulated upon said first accumulator.

2. The combination with a cash register mechanism including manipulative amount determining elements, operating mechanism controlled thereby and an accumulator, of a second accumulator operatively connected with and controlled by the operation of the first mentioned accumulator for simultaneously adding upon the second accumulator a sum proportionate to a portion of the sum added upon the first accumulator plus an arbitrarily fixed amount in compensation of the remainder of the initial sum.

3. The combination with a cash register, including manipulative amount determining devices, operating mechanism controlled thereby and an accumulator having differentially operable elements representing units, tens, hundreds, etc. of a second accumulator also having differentially operable like elements, the units, tens and hundreds elements of the second accumulator being operatively connected for unison operation with the tens, hundreds and thousands elements respectively, of the first mentioned accumulator and means for adding upon said second accumulator, amounts for which no corresponding addition is made upon the first accumulator.

4. The combination with a cash register, including manipulative amount determining devices, operating mechanism controlled thereby and an accumulator having differentially operable elements of a second accumulator, and operative connections thereto by which the manipulation of the amount determining elements to add a given sum to the first accumulator will effect addition of one cent to the second accumulator for each ten cents added upon the first accumulator and an additional one cent for five cents added upon the first accumulator in addition to any addition of ten cents or multiple thereof.

5. In a cash register, the combination with an operating mechanism and manipulative amount determining elements controlling the performance of the operating mechanism of a series of counter wheels actuated thereby, a swinging frame, a second series of counter wheels carried by the swinging frame means for oscillating the frame to move said second series of counter wheels into and out of operative position relative to the first series of counter wheels and interoperative connection between the counter wheels of the respective series for causing said second counter wheels to be actuated to different degree by the operation of the first mentioned counter wheels under the control of a single set of manipulative amount determining elements when the frame is swung to one position but inoperative when said frame is swung to another position, and means for controlling the oscillation of said frame.

6. In a cash register, the combination with an operating mechanism and manipulative amount determining elements controlling the performance of the operating mechanism, of two accumulators, each comprising a series of differentially operable denominational elements, the respective series of elements being arranged in parallel relation, with different denominational elements in the respective series being interconnected in pairs for simultaneous operation and means for actuating the accounting elements of one series by the action of said operating mechanism, the members of the second series being actuated by those of the first series of different denominations to add thereon proportional amounts and means for causing the accumulation thereon of additional amounts disproportional to the addition accumulated on the accounting elements of the first series.

7. An accounting mechanism for simultaneously characterizing proportional sums wherein a series of manipulative amount determining elements representing different numerical values controls a differential operative mechanism through different degrees of operation according to the numerical value of the amount determining element manipulated, characterized by an accounting device actuated at each operation of the operating mechanism, and a second accounting device movable into and out of operative connection with the operating means, said operating means causing different amounts to be characterized upon the different accounting devices by the same degree of operation thereof.

8. An accounting mechanism for simultaneously characterizing proportional sums wherein a series of manipulative amount determining elements representing different numerical values controls a differential operative mechanism through different degrees of operation according to the numerical value of the amount determining element manipulated, characterized by a plurality of accounting devices, common to the amount determining elements and operating mechanism, and operating mechanism by which different amounts may be characterized upon the different accounting devices at each cycle of operation of the operating mechanism, and means for moving one of said accounting devices into and out of operative connection with the operating mechanism independent of another of said accounting devices.

9. In an accounting apparatus, the combination with manipulative amount determining elements, and operating mechanism controlled thereby, of an accounting device to be actuated by the operating mechanism to characterize thereon an amount different from that represented by the manipulated amount determining elements and means for operatively connecting said accounting device with the operating mechanism, for intermittent operation whereby the accounting device will not be actuated at each operation of the manipulative amount determining elements.

10. In an accounting apparatus, a plurality of accounting devices each embodying a series of denominational counter elements, and interconnections between counter elements of different denomination in the respective accounting devices whereby said different denominational counters pertaining to different accounting devices are actuated in unison and means for transmitting to the counters of one set movement disproportionate to the amount added to the other set of counters.

11. In an accounting apparatus, a plurality of accounting devices each embodying a series of denominational counters, and means for operating a counter of one accounting device in unison with a counter of different denomination of the other accounting device and means for giving to the first counter additional movement disproportionate to the movement of the other accounting device.

12. In an accounting apparatus, a plurality of accounting devices each embodying a series of denominational counter elements, and operating means by which the operation of a counter element of one accounting device will cause the operation of a counter element of different denomination of the other accounting device and means for operating said counter elements differentially.

13. In an accounting apparatus, an accounting device embodying a series of denominational counters and one sub unit counter, actuating means therefor, and means for counting a full unit upon the succeeding counter for each accumulation of a predetermined fractional part of one unit upon the sub unit counter.

14. In an accounting apparatus, the combination with a control means, and operating means controlled thereby, of a plurality of accounting devices each comprising a series of denominational counter elements, counter elements of one accounting device being connected for unison operation with different denominational counter elements of the other accounting device, and means for advancing such connected counter elements additional steps for which no proportionate amount is added to such other accounting devices, the denominational reading of the counter elements of each accounting device being transposed in relation with the denominational reading of the counter elements of the other accounting device.

15. In an accounting apparatus, the combination with control means and operating mechanism controlled thereby, of an accounting device actuated by the operating mechanism and embodying a series of counting elements, transfer means whereby a portion of the counting elements at the completion of each accumulation equivalent to one unit of the next higher denomination, adds one upon the next higher denomination of counting elements, and transfer means whereby the remainder of the said elements will add one upon the element of next higher denomination at the completion of every accumulation of a predetermined fractional part of one unit of such next higher denomination.

16. In an accounting apparatus, the combination with a plurality of accounting devices, a control means common thereto, and an operating mechanism, of means for causing one unit to be characterized upon one of said accounting devices for each predetermined number of units characterized upon the other accounting device, and an additional one unit to be characterized upon the first mentioned accounting device for each series of units less than the predetermined number characterized upon the second mentioned accounting device at each operation thereof.

17. In an accounting apparatus, the combination with a plurality of accounting devices, a control means common thereto, and an operating mechanism, of means for causing one unit to be characterized upon one of said accounting devices for each predetermined number of units characterized upon the other accounting device, and an additional one unit to be characterized upon the first mentioned accounting device for each series of units of less than the predetermined number in excess of said predetermined number, or any multiple thereof characterized upon the second mentioned accounting device at each operation thereof.

18. A cash register wherein a series of manipulative amount determining elements effect the addition upon an accumulator of the amount represented by the manipulated amount determining elements, characterized by a second accumulator and means for adding thereon a predetermined proportionate amount of a predetermined number and multiples thereof, and like proportionate part of the said number or multiple thereof next higher than a sum not a multiple of such number, added to the first accumulator.

19. A cash register wherein a series of maniplative amount determining elements effect the addition upon an accumulator of the amount represented by the manipulated amount determining elements, characterized by a second accumulator and means for simultaneously adding thereupon a proportionate part of a given number and multiples thereof added upon the first accumulator and an addition of one unit for any fractional part of such number in excess of a multiple of said number which may be added to the first accumulator.

20. An accounting mechanism for simultaneously characterizing different related sums wherein a series of manipulating amount determining elements representing different numerical values controls a differential operative mechanism through different degrees of operation according to the numerical value of the amount determining elements manipulated, characterized by a plurality of accounting devices common to the amount determining elements and operating means by which the accounting devices may be actuated to simultaneously characterize thereon different interrelated amounts determined by the numerical value of manipulated amount determining elements, and means for rendering one of said accounting devices inoperative.

21. The combination with a cash register mechanism including manipulative amount determining elements, operating mechanism controlled thereby, an accumulator controlled by the amount determining elements, and a second accumulator operatively connected with and controlled by the operation of the first mentioned accumulator to simultaneously add upon the second accumulator a different sum determined by the same manipulation of the amount determining elements, and means for disconnecting the second accumulator from the first accumulator whereby such sum may be added only upon one accumulator.

22. An accounting mechanism wherein a series of manipulative amount determining elements representing different numerical values controls a differential operative mechanism through different degrees of operation according to the numerical value of the amount determining elements manipulated, characterized by a plurality of interconnected accounting devices common to the amount determining elements and operating means by which one of the accounting devices may be actuated to characterize thereon an amount determined by the numerical value of manipulated amount determining elements, motion being transmitted by the adjustment of one accounting device to a succeeding accounting device of the plurality to simultaneously characterize thereon a different amount determined by the adjustment of the preceeding accounting device.

23. An accounting mechanism wherein a series of manipulative amount determining elements representing different numerical values controls a differential operative mechanism through different degrees of operation according to the numerical value of the amount determining elements manipulated, characterized by a plurality of interconnected accounting devices common to the amount determining elements and operating means by which one of the accounting devices may be actuated to characterize thereon an amount determined by the numerical value of manipulated amount determining elements, motion being transmitted by the adjustment of one accounting device to a succeeding accounting device of the plurality to simultaneously characterize thereon a different amount determined by the adjustment of the preceding accounting device, and means for rendering one of said accounting devices inoperative.

24. In a machine of the class described, the combination of a totalizer comprising a plurality of totalizer elements each appropriate to a certain numerical order, actuators therefor, means intermediate of each two adjacent elements for giving the element of higher order a step of movement independent of its actuator upon the completion of a predetermined extent of actuation of the element of lower order, and an element adjacent the totalizer element of lower order and similar in construction thereto, but having no numerical order for giving said totalizer element of lowest order a step of movement independent of its actuator.

25. In a machine of the class described, the combination of a totalizer element, an actuator therefor, an element adjacent the totalizer element and similar in construction thereto but having no numerical order value, and means intermediate of said last mentioned element and said totalizer element for giving the totalizer element a single step of actuating movement independent of its actuator upon each actuation of said additional element.

26. In a machine of the class described, the combination of a totalizer element, an actuator therefor, an additional element adjacent the totalizer element and similar in construction thereto, an actuator for said additional element, and means intermediate of the additional element and the totalizer element for giving a single step of movement to the totalizer element independent of its actuator upon every actuation of said additional element.

27. In a machine of the class described, the combination of a totalizer comprising a plurality of denominational wheels denominational actuators for said wheels, means intermediate of a wheel of lower order and a wheel of higher order for imparting a single step or movement to the wheel of higher order independent of its actuator upon each complete rotation of the totalizer wheel of next lower order, means carried by the wheel of lower order for controlling the effectivity of said intermediate means, an additional wheel adjacent the totalizer wheel of lowest denominational order and similar in construction thereto, but having no denominational order value, means intermediate of said additional wheel and said lowest order totalizer wheel for giving the latter a step of movement upon every actuation of the former said additional wheel having a plurality of means for controlling the effectivity of said intermediate means.

28. In a machine of the class described, the combination of a plurality of accounting devices involving a plurality of accounting elements, means for actuating an element of one device an extent equal to the extent of actuation of an element of higher order of another device, and means for additionally actuating said first mentioned element upon each actuation of an element of like order in said second device.

29. In a machine of the class described, a totalizer involving totalizing elements, a plurality of actuators co-operating with a single totalizer element, means whereby one of said actuators will move said element proportionately to the extent of its movement, and means whereby another of said actuators may cause said element to move disproportionately to the extent of movement of such actuator.

30. In a machine of the class described, the combination of a totalizer, a set of keys, key driven totalizer actuators movable to extents commensurate with the amount represented by the operated keys, and means operated by one of said actuators for effecting a constant entry regardless of the extent of actuation of said actuator.

31. In a machine of the class described, a totalizer, actuators therefor, and means whereby one of the actuators will control the entry of a constant amount at each operation of the machine regardless of the extent of movement of said actuator.

32. In a machine of the class described, a plurality of totalizers, a set of keys common to both totalizers, and an operative connection between the keys and totalizers whereby the totalizers are simultanenously driven from the keys to different extents.

33. An accounting mechanism for simultanenously characterizing proportional sums wherein a series of manipulative amount determining elements representing different numerical values controls a differential operative mechanism through different degrees of operation according to the numerical value of the amount determining element manipulated, characterized by a plurality of accounting devices common to the amount determining elements and operating mechanism and capable of simultanenous operation thereby upon which different related proportional amounts may be characterized by a single operation of the amount determining elements and means for temporarily rendering one of said accounting devices inoperative and means for automatically restoring such inoperative accounting device to operative condition at the completion of the cycle of operation.

In testimony whereof, we have hereunto set our hands this 19th day of April, A. D. 1919.

GEORGE N. LINGHAM.
HARRY W. WILLIAMS.